United States Patent [19]

Hoffmann et al.

[11] Patent Number: 5,036,439

[45] Date of Patent: Jul. 30, 1991

[54] CAR HEADLIGHT LAMP AND METHOD OF MANUFACTURING SAME

[75] Inventors: Friedrich Hoffmann, Alsdorf; Leo Wings, Eschweiler, both of Fed. Rep. of Germany

[73] Assignee: U.S. Philips Corporation, New York, N.Y.

[21] Appl. No.: 433,063

[22] Filed: Nov. 6, 1989

[30] Foreign Application Priority Data

Nov. 4, 1988 [DE] Fed. Rep. of Germany ....... 3837511

[51] Int. Cl.$^5$ .............................................. B60Q 1/00

[52] U.S. Cl. ...................................... 362/61; 362/255; 362/305; 362/376; 313/113; 313/318; 313/623; 313/51

[58] Field of Search .................. 362/61, 80, 297, 298, 362/255, 377, 226, 302-305, 457, 376, 378, 263; 313/318, 113, 234, 114, 623, 624, 49, 51

[56] References Cited

U.S. PATENT DOCUMENTS

| | | | |
|---|---|---|---|
| 3,050,619 | 8/1962 | Abramson | 362/255 |
| 3,553,520 | 1/1971 | Hicks | 313/113 |
| 4,722,039 | 1/1988 | Gaugel | 362/61 |
| 4,754,373 | 6/1988 | Otto et al. | 362/296 |
| 4,774,636 | 9/1988 | Gaugel et al. | 362/263 |
| 4,868,456 | 9/1989 | Sanders et al. | 313/318 |

*Primary Examiner*—Ira S. Lazarus
*Assistant Examiner*—D. M. Cox
*Attorney, Agent, or Firm*—Robert J. Kraus

[57] ABSTRACT

A car headlight lamp having a lamp envelope (1), which is closed by seals (2) through which current lead-in members (3,4) are passed and is secured by a holding member to a socket (17), the holding member having a dipping cap (12), which at least partly surrounds the lamp envelope and is connected to a current lead-in member (4) of the lamp envelope. The socket (17) has an outwardly projecting cylindrical flange bush (24) for receiving the lamp envelope (1) and the lamp envelope has a tubular prolongation (6), onto which a clamping sleeve (7) is slipped, which consists of a cylindrical sleeve body (8), which has an outer flange (9) secured to the flange bush and several inwardly directed resilient tongues (10), which bear on the prolongation of the envelope. The dipping cap (12) is secured to the clamping sleeve (7).

6 Claims, 4 Drawing Sheets

CAR HEADLIGHT LAMP AND METHOD OF MANUFACTURING SAME

BACKGROUND OF THE INVENTION

The invention relates to a car headlight lamp having a lamp envelope, which has seals which are located opposite to each other and through which current lead-in members are passed to an electrical element and which is secured by means of a holding member to a socket, the holding member having a dipping cap, which at least partly surrounds the lamp envelope and is connected to a current lead-in member of the lamp envelope.

In a car headlight high-pressure discharge lamp of this kind known from EP 0 231 935 A2, corresponding to U.S. Pat. No. 4,722,039, the holding member has an arcuate securing body of synthetic material, which is provided with a strip of isolating material, which extends parallel to the axis of the lamp. This strip is in the form of a gutter and acts as a dipping means for obtaining an asymmetrical light distribution. On the outer side of the strip, an electrical conductor is introduced, which establishes the electrical connection between the current lead-in member of the lamp remote from the socket and a first socket contact. The other current lead-in member is connected to a second socket contact. A securing element of the holding member is inserted into a cylindrical recess of a socket consisting of synthetic material. During the manufacture, the holding member with the lamp envelope is adjustable with respect to the socket in longitudinal direction; moreover, this construction permits a slight tilting movement of the lamp envelope with respect to the socket. Because of the electrical conductors passed through the socket, however, a transverse displacement between the holding member and the socket is not possible. Moreover, the lamp envelope is then solely held by means of the comparatively sensitive current lead-in members thereof.

Also in a car headlight lamp known from EP 0 224 954 A1, corresonding to U.S. Pat. No. 4,823,049, the lamp envelope is held only at the current lead-in members projecting from both sides. In the later road traffic, this may lead to a bending of the current lead-in members so that the lamp envelope loses its predetermined position in the optical system.

SUMMARY OF THE INVENTION

The invention amongst others has for its object to provide a car headlight lamp of the kind mentioned in the opening paragraph, in which the lamp envelope is held in a stable position, and in which during the manufacture a three dimensional alignment of the lamp envelope with respect to the lamp socket is possible.

According to the invention, this object is achieved in that the socket has an outwardly projecting cylindrical flange bush for receiving the lamp envelope and the lamp envelope has a tubular prolongation, on which a clamping sleeve is placed, which comprises a cylindrical sleeve body, which has an outer flange secured to the flange bush and several inwardly directed resilient tongues, which bear on the prolongation, and in that the dipping cap is electrically conducting and is secured to the clamping sleeve.

The lamp envelope is held by the clamping sleeve on which, before it is fixed to the cylindrical flange bush of the socket, is displaceable in transverse direction with respect thereto. Moreover, the clamping sleeve carries the dimming hood, which surrounds the lamp envelope, is electrically conducting and establishes at its free end the electrical connection with the current lead-in member of the free end of the lamp envelope. As a result thereof a mechanical support of the free end of the lamp envelope is obtained, too. Thus, the lamp envelope is held in a reliable manner at a stable envelope portion. During the manufacture, the lamp envelope can be aligned in all directions with respect to a reference axis or reference plane.

If the dipping cap should serve as a mechanical protection for the lamp envelope too, according to a further embodiment of the invention, it is constructed as a tube. Said tube surrounds the lamp envelope, is provided with at least one light emanating opening and is introduced by one end into the cylindrical sleeve body of the clamping sleeve and is closed at the free end by a disk provided with an opening for receiving the respective current lead-in member.

A particularly stable construction occupying little space is obtained if according to a further embodiment of the invention the clamping sleeve with its sleeve body projects into the flange bush with transverse clearance. Also in this case, during the manufacture of the lamp the clamping sleeve can be displaced in the cylindrical flange bush in all directions transverse to a reference axis extending through the centre of the flange bush. The mounting of the lamp is further facilitated if according to an advantageous embodiment of the invention the flange bush, the clamping sleeve and the dipping cap with its disk consist of metal and the parts are welded or soldered to each other.

The headlight lamp may be an incandescent lamp, the electrical element being an incandescent body. If in the car headlight lamp according to the invention a discharge lamp having a gas-filled lamp envelope, housing a pair of electrodes as the electrical element is used, a demixing of the gas filling may occur when surrounding the lamp envelope by a metal tube. In order to avoid this, according to a further embodiment of the invention, the metallic tube can have an electrically isolating coating on the inner side thereof, that is the side directed towards the lamp envelope.

The invention also relates to a method of manufacturing the car headlight lamp of the invention. According to the invention, this method is characterized in that first a clamping sleeve comprising a cylindrical sleeve body having an outer flange and several inwardly directed resilient tongues, is palced on a tubular prolongation of the lamp envelope, the dipping cap is secured to the clamping sleeve, the lamp envelope is aligned with respect to the clamping sleeve and the dipping cap and a disk provided with an opening is slipped over a current lead-in member and is connected to the free end of the dipping cap, after which the clamping sleeve is caused to engage by its outer flange the flange of the flange bush and is aligned in the contact plane thereof, whereupon the two flanges are secured to each other, and in that subsequently, as the case may be after a further alignment of the lamp envelope by displacement thereof with respect to the dipping cap, the current lead-in member of the lamp envelope remote from the socket is rigidly secured to the dimming hood.

BRIEF DESCRIPTION OF THE DRAWING

In order that the invention may be readily carried out, it will now be described more fully with reference to the accompanying drawing, in which.

DESCRIPTION OF THE PREFERRED EMBODIMENTS

Figure 1:
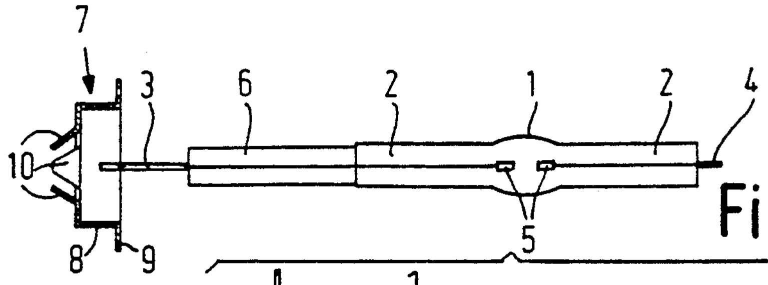
FIGS. 1 to 3 show different processing steps in the manufacture of a car headlight lantern.

FIG. 1 shows the lamp envelope 1 of a high-pressure gas discharge lamp, which has seals 2, which are located opposite to each other and through which current lead-in members 3 and 4 are passed to an electrical element 5. These current lead-in members 3 and 4 carry the electrodes 5 within the lamp envelope 1. The lamp envelope 1 is filled with a gas, which besides mercury comprises metal halide, for example sodium iodide. The discharge space has a content of about 130 mm$^3$. The lamp envelope 1 has a tubular prolongation 6. The lamp envelope 1 and the tubular prolongation 6 consist, for example, of quartz glass. During the manufacture of the headlight lamp, first a clamping sleeve 7 consisting, for example, of resilient metal is placed on the tubular prolongation 6 of the lamp envelope 1. This clamping sleeve 7 consists of a cylindrical sleeve body 8 with an outer flange 9 at one end and four inwardly directed resilient tongues 10 at the other end.

Figure 2:
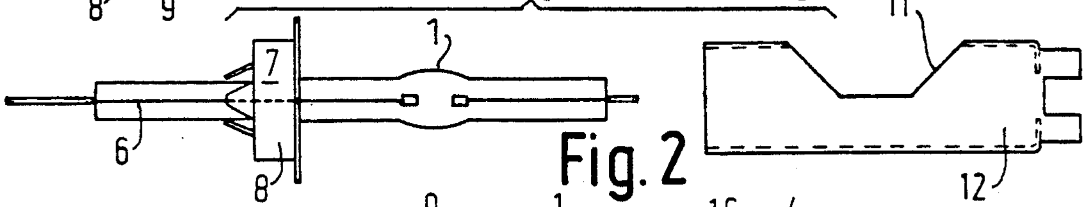
Figure 5:
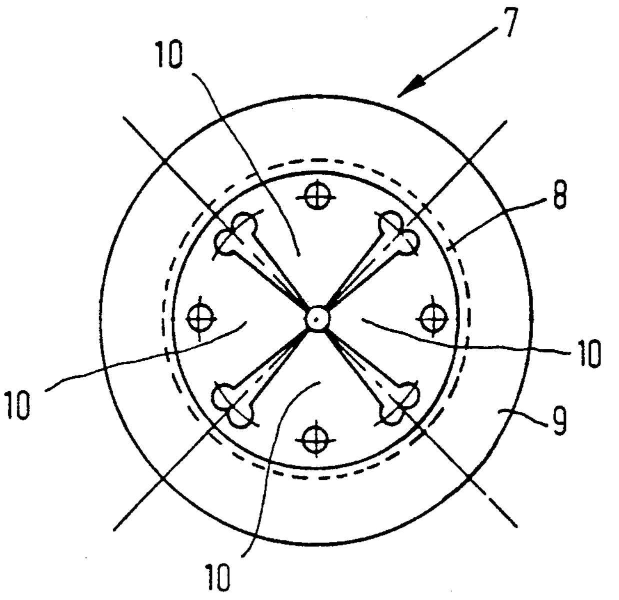
FIG. 5 is the rear view of the clamping sleeve before it is placed on the prolongation of the lamp envelope.
Figure 4:
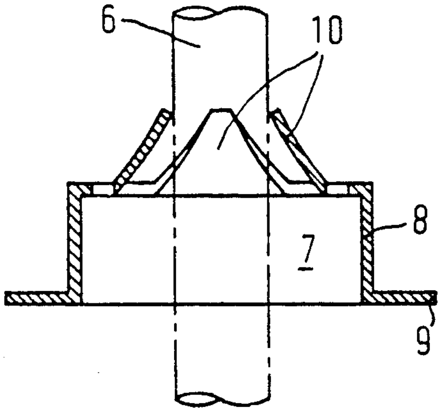
FIG. 4 shows on an enlarged scale a sectional view of a clamping sleeve slipped onto a tubular prolongation of the lamp envelope.
Figure 6:
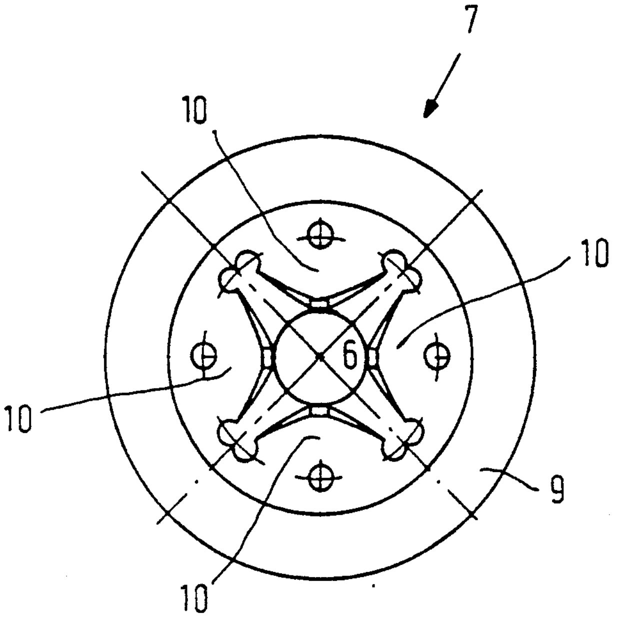
FIG. 6 is a corresponding rear view of the clamping sleeve after it has been placed on the prolongation of the lamp envelope.

In FIG. 2, the clamping sleeve 7 is slipped as fas as the seal 2 onto the tubular prolongation 6, its resilient tongues 10 bearing on the prolongation 6 of the envelope. This is shown in FIG. 4 on an enlarged scale. FIG. 5 shows the clamping sleeve 7 before it is placed on the prolongation 6 of the envelope and FIG. 6 shows the clamping sleeve 7 when it has been slipped onto the prolongation 6 of the envelope. More particularly it appears from FIG. 6 that the four resilient tongues 10 of the clamping sleeve 7 engage in a point or in a line the prolongation 6 of the envelope and hold it between them.

Figure 3:
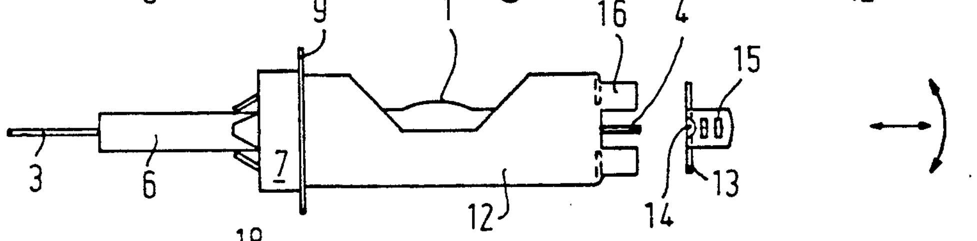

According to FIG. 2, a tube 12 of metal provided with a light-emanating opening 11 is then introduced as a dipping cap into the cylindrical sleeve body 8 of the clamping sleeve 7 and is attached to the sleeve body 8 by welding or soldering (cf. FIG. 3). Subsequently, the lamp envelope 1 is aligned on an optical bench within the assembly comprising the clamping sleeve 7 and the tube 12 in that the lamp envelope 1 is displaced in the longitudinal direction or is pivoted in the plane of the engagement points of the resilient tongues 10 of the clamping sleeve 7 on the prolongation 6 of the envelope. After this alignment operation, a metal disk 13 is placed on the free end of the tube 12, this disk being provided with an opening 14 for receiving the current lead-in member 4 of the lamp envelope 1. The metal disk 13 is then secured to the tube 12 by welding or soldering, as a result of which the lamp envelope 1 is fixed in its aligned position within the tube 12. The lamp envelope 1 is then still displaceable within the tube 12 in the longitudinal direction. In order to allow later securing the current lead-in member 4, a connection vane 15 is provided at the metal disk 13. In order to protect this connection vane 15 from external damage, the tube 12 is provided at its end with a few protruding lobes 16, which are arranged to surround the connection vane 15.

Figure 7:
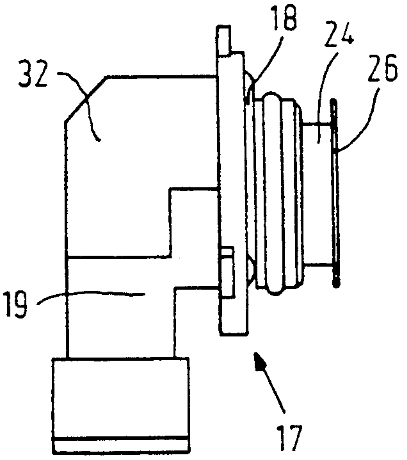
FIG. 7 is a side elevation of a lamp socket.
Figure 8:
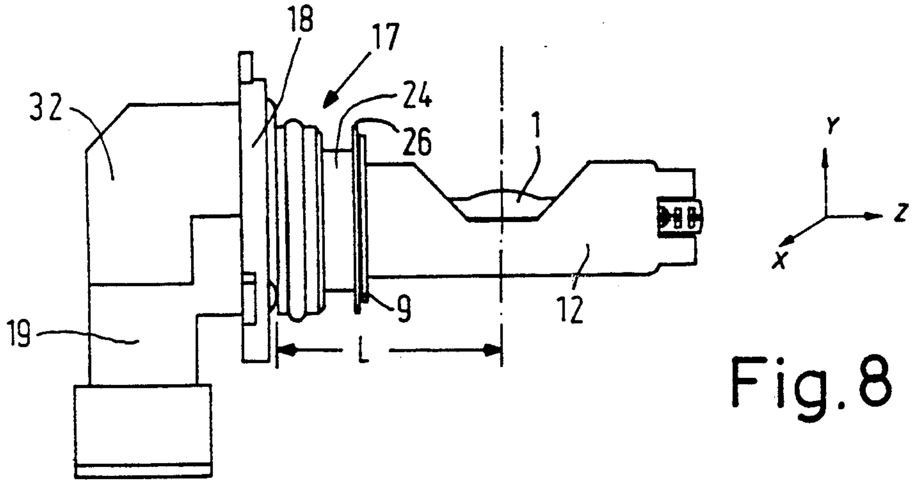
FIG. 8 is a side elevation of a mounted car headlight lantern.
Figure 9:
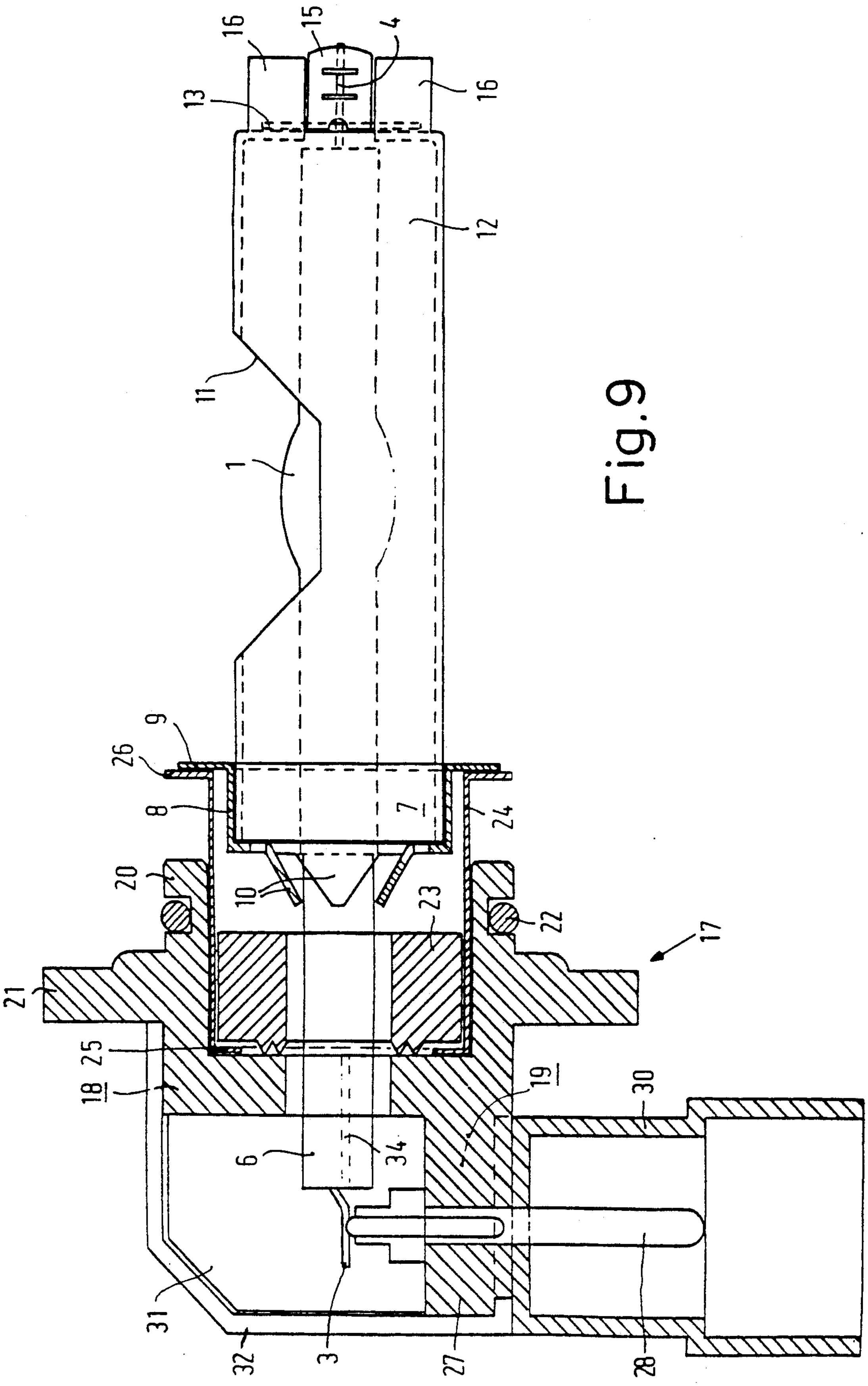
FIG. 9 shows on an enlarged scale a longitudinal sectional view of the car headlight lantern shown in FIG. 8.

Subsequently, the lamp envelope 1 held in the clamping sleeve 7 and the tube 12 is inserted into a socket 17 (FIG. 7) (cf. FIG. 8). As appears more particularly from FIGS. 9 and 10, the socket 17 comprises a housing portion 18 for receiving the lamp envelope 1 and a plug portion 19 for connection to an electrical current supply. The housing portion 18 has a cylindrical socket sleeve 20 with an integrally formed adjustment ring 21 and an inserted sealing ring 22 and serves for insertion into a corresponding fitting of a car headlight. In the socket sleeve 20, a cylindrical flange bush 24 of metal is secured by means of a tubular insertion piece 23 of isolating material, for example in that the tubular insertion piece 23 of synthetic material is welded to the housing part 18 also consisting of synthetic material, as a result of which the edge 25 on the side of the bottom of the flange bush 24 is clamped between the housing part 18 and the insertion piece 23. The flange provided at the front edge of the flange bush 24 and projecting outwards is designated by reference numeral 26. The cylindrical sleeve body 8 of the clamping sleeve 7 has transverse clearance within the cylindrical flange bush 24. The clamping sleeve 7 with the lamp envelope 1 and the tube 12 is introduced over such a distance into the flange bush 24 that the outer flange 9 of the clamping sleeve 7 engages the flange 26 of the flange bush 24. The clamping sleeve 7 with the lamp envelope 1 can now be aligned—again on an optical bench—with respect to a reference axis passing through the centre of the flange bush 24 in the x and y directions (cf. FIG. 8, after which the outer flange 9 of the clamping sleeve 7 is secured to the flange 26 of the flange bush 24 by welding or soldering. Since the lamp envelope 1 is aligned within the clamping sleeve 7 and the tube 12, it is true, but is not yet fixed, it can be still be displaced over such a distance in the longitudinal direction, that is to say in the z direction, that the required light centre length L between the discharge centre and the front abutment of the adjustment ring 21 is attained. Subsequently, the current lead-in member 4 passed through the holde 14 of the metal disk 13 is secured to the connection vane 15 of the metal disk 13 by welding or soldering. The lamp envelope 1 with its tube 12 is now held at the socket 17 in a fixed and aligned position.

Figure 10:
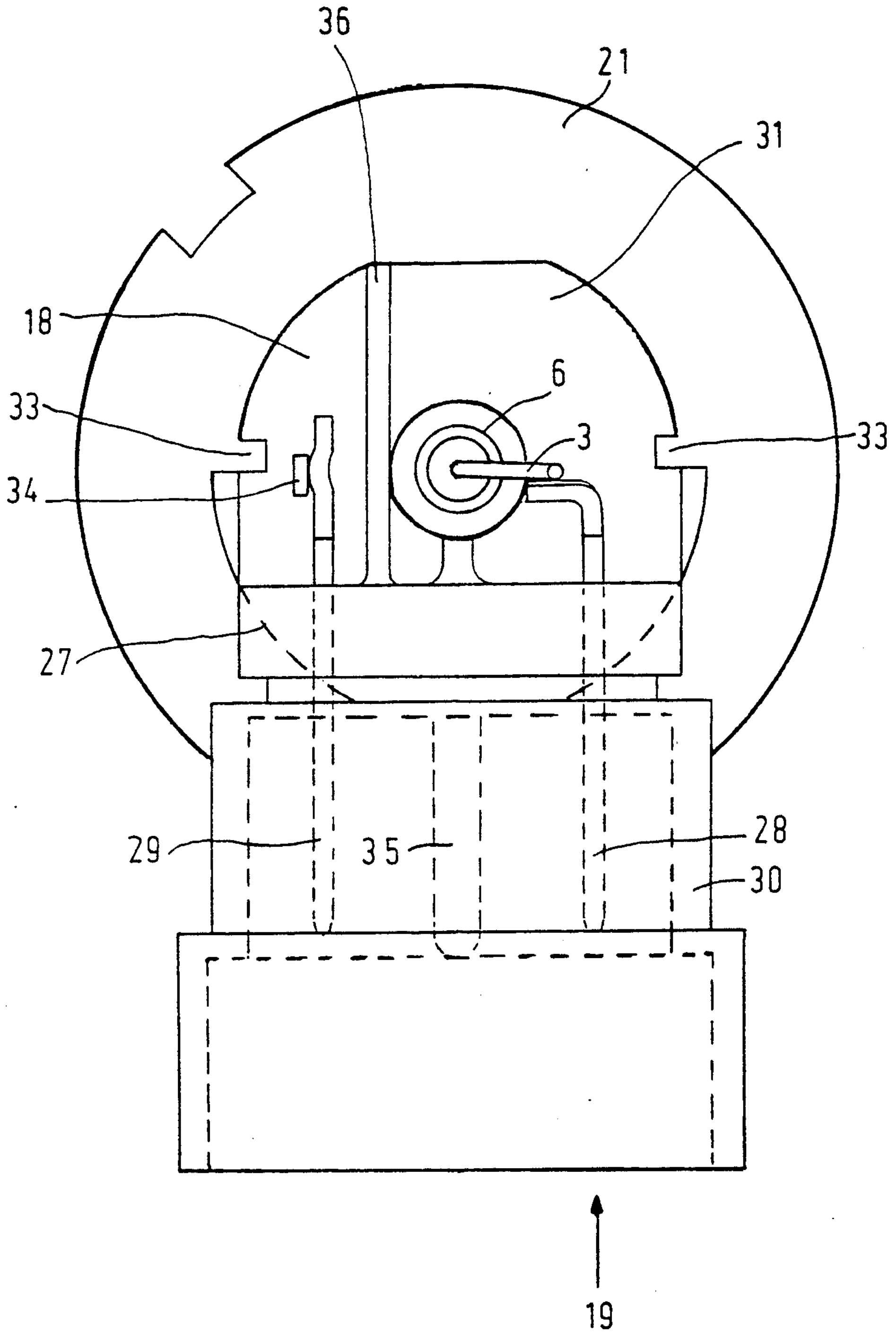
FIG. 10 shows the rear view of the car headlight lantern shown in FIG. 9, of which the dimming hood is removed.

The plug portion 19 of the socket 17 has a plate 17, which extends from the housing portion 18 backwards and into which two plug pins 28 and 29 are inserted, which merge into an elongate sleeve 30 for receiving the plug. Above the plate 27 is arranged a free space 31, which can be closed by a removable covering hood 32, which can be inserted into guides 33 in the housing portion 18 (FIG. 10).

Not only the two plug pins 28 and 29 as well as the tubular prolongation 6 of the lamp envelope 1 with the current lead-in member 3, but also a tongue 34 of electrically conducting material connected to the edge 25 of the flange bush 24 and connected in the space 31 to the plug pin 29 merge into this space 31. Thus, the plug pin 29 to be connected to earth is connected to the current lead-in member 4 of the lamp envelope 1 through the tongue 34, the flange bush 24, the clamping sleeve 7, the tube 12 and the metal disk 13. The other current lead-in member 3 of the lamp envelope 1 is connected within the space 31 to the contact pin 28. Since for operation of a car headlight high-pressure discharge lamp transient voltages up to 15 kV are required, a separation wall 35 and 36, respectively, of isolating material is provided in the sleeve 30 for receiving the plug between the plug pins 28 and 29 respectively in the space 31 between the current tongue 34 and the current lead-in member 3.

If the distance between the metal tube 12 and the lamp envelope 1 is small, i.e. with a small tube diameter, it may be advisable to provide the tube with an isolating inner coating or with a layer or with an insert of ceramic material. Thus, the risk of a demixing of the gas filling of the lamp envelope 1 can be avoided.

What is claimed:

1. An improved car headlight lamp of the type comprising a longitudinally extending lamp envelope having first and second electrical leads extending from respective sealed first and second ends of the envelope, a socket, and holding means for attaching the envelope to the socket, characterized in that the lamp comprises:

a. an electrically conductive tubular bush part of the socket having an outwardly extending flange;

b. an electrically conductive tubular clamping sleeve having an outwardly extending flange affixed to the flange of the bush at a transversely adjusted position and having a plurality of inwardly directed resilient members bearing on the first end of the envelope at a longitudinally adjusted position;

c. an electrically conductive dipping cap at least partially surrounding the lamp envelope, said dipping cap having a first end affixed to the clamping sleeve and having a second end including means connected to the second electrical lead for rigidly holding said lead at a stable transverse position; and d. contact means of the socket electrically connected to the first electrical lead.

2. A lamp as in claim 1 where the dipping cap comprises a tubular member having a light passing opening, where the first end of the dipping cap is disposed in the clamping sleeve, and where the means connected to the second electrical lead comprises a transversely adjusted conductive disk closing the second end of the dipping cap and having an opening through which the second electrical lead passes.

3. A lamp as in claim 1 or 2 where the clamping sleeve includes a tubular portion disposed within the tubular bush with a transverse clearance between the sleeve and the bush.

4. A lamp as in claim 2 where the bush, the clamping sleeve, the dipping cap and the disk comprise metallurgically joined metal parts.

5. A lamp as in claim 4 where the dipping cap has an inner surface bearing an electrically insulating coating.

6. A method of manufacturing a car headlight lamp having a lamp envelope, which has seals which are located opposite to each other and through which current lead-in members are passed, and which envelope is secured by means of a holding member to a socket, the holding member having a dipping cap, which at least partly surrounds the lamp envelope and is connected to a current lead-in member of the lamp envelope, characterized in that a clamping sleeve (7) consisting of a cylindrical sleeve body (8) having an outer flange (9) and several inwardly directed resilient tongues (10) is placed on a tubular prolongation (6) of the lamp envelope (1), the dipping cap (12) is secured to the clamping sleeve, the lamp envelope is aligned with respect to the clamping sleeve and the dipping cap and a disk (13) provided with an opening (14) is slipped over a current lead-in member and is secured to the free end of the dimming hood; the clamping sleeve is caused to engage by its outer flange (9) the flange (26) of the flange bush (24) is aligned the flanges being in engagement with each other and the two flanges are then secured to each other; and in that, as the case may be after a further alignement of the lamp envelope by displacement thereof with respect to the dipping cap, the outer current lead-in member of the lamp envelope is rigidly connected to the dipping cap.

* * * * *